United States Patent
Tiefenthaler et al.

(10) Patent No.: US 8,797,511 B2
(45) Date of Patent: Aug. 5, 2014

(54) DISTANCE MEASURING DEVICE AND SURVEYING SYSTEM

(75) Inventors: Stefan Tiefenthaler, Meiningen (AT); Johann Hofer, Dornbirn (AT); Torsten Gogolla, Schaan (LI)

(73) Assignee: Hilti Aktiengesellschaft, Schaan (LI)

( * ) Notice: Subject to any disclaimer, the term of this patent is extended or adjusted under 35 U.S.C. 154(b) by 152 days.

(21) Appl. No.: 13/306,124

(22) Filed: Nov. 29, 2011

(65) Prior Publication Data

US 2012/0133917 A1  May 31, 2012

(30) Foreign Application Priority Data

Nov. 30, 2010  (DE) .................. 10 2010 062 161

(51) Int. Cl.
*G01C 3/08*  (2006.01)

(52) U.S. Cl.
USPC ......... 356/4.01; 356/3.01; 356/4.1; 356/5.01; 356/5.1

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 5,815,251 A | 9/1998 | Ehbets et al. | 356/5.01 |
| 6,069,656 A | 5/2000 | Silver | |
| 6,137,564 A | 10/2000 | Schmidt et al. | 356/4.01 |
| 6,246,051 B1 | 6/2001 | Ozawa | |
| 6,463,393 B1 | 10/2002 | Giger | 702/97 |
| 6,603,534 B2 | 8/2003 | Seifert et al. | 356/4.01 |
| 6,917,415 B2 | 7/2005 | Gogolla et al. | 356/5.06 |
| 7,142,288 B2 | 11/2006 | Stierle | 356/4.01 |
| 7,293,366 B2 | 11/2007 | Schulte | 33/700 |
| 7,324,218 B2 | 1/2008 | Stierle | 356/614 |
| 7,684,058 B2 | 3/2010 | Sprenger | 356/314 |
| 2004/0046953 A1 | 3/2004 | Nagata et al. | |
| 2007/0206174 A1 | 9/2007 | Boegel et al. | 356/4.01 |
| 2009/0119050 A1* | 5/2009 | Hayashi | 702/94 |

FOREIGN PATENT DOCUMENTS

| | | |
|---|---|---|
| DE | 198 04 051 B4 | 8/1999 |
| DE | 100 51 302 C5 | 4/2002 |
| DE | 101 12 833 C1 | 3/2003 |
| DE | 101 57 378 | 6/2003 |
| DE | 102 32 878 | 2/2004 |
| DE | 103 44 586 | 4/2005 |
| DE | 10 2008 018 139 | 10/2009 |
| EP | 0 701 702 | 3/1996 |
| EP | 0816868 | 1/1998 |
| EP | 196 43 287 | 4/1998 |
| EP | 1 913 416 | 4/2004 |
| EP | 1 718 989 B1 | 11/2006 |
| WO | WO2008052365 | 5/2008 |

* cited by examiner

*Primary Examiner* — Luke Ratcliffe
(74) *Attorney, Agent, or Firm* — Davidson, Davidson & Kappel, LLC (57) ABSTRACT

A distance-measuring device for contactless measurement of a distance to an object, including a housing; a contactless measuring apparatus utilizing an optical measuring beam arranged in the housing and having a radiation unit, an optical unit with optical elements encompassing at least a transmitting and receiving lens system, an optical transmitting path with an optical axis for emitting a measuring beam onto the target object, an optical receiving path with an optical axis for receiving a measuring beam that is reflected and/or scattered by the target object. At least one optical element is movable relative to an initial position; a motion sensor detects a movement of the object, the optical element movable out of the initial position into a variable compensation position so that the transmitting path can be stabilized at a spatially fixed position.

24 Claims, 5 Drawing Sheets

DISTANCE MEASURING DEVICE AND SURVEYING SYSTEM

This claims the benefit of German Patent Application DE 10 2010 062 161.7, filed Nov. 30, 2010 and hereby incorporated by reference herein.

The present invention relates to a distance-measuring device, especially in the form of a handheld device, for the contactless measurement of the distance to a target object.

BACKGROUND

A distance-measuring device of the above-mentioned type is employed particularly as a handheld laser distance meter. A contactless measurement of the distance to a target object normally makes use of an optical measuring beam such as, for example, a laser beam. Fundamentally, different methods are known for distance measurement, irrespective of the measuring beam employed. For instance, the distance to a target object can be measured contactlessly by means of a runtime measurement, a phase measurement or a laser triangulation. In order to implement such methods or similar ones, the housing of the measuring device contains a measuring apparatus that utilizes an optical measuring beam by means of which the distance to the target object can be measured contactlessly. An advantageously configured measuring apparatus for carrying out a contactless distance measurement by means of a runtime measurement is given by way of an example in German patent specification DE 101 12 833 C1. This apparatus has a radiation unit in the form of a laser unit. Moreover, there is also an optical unit with optical elements that serve to guide the beam. The optical elements comprise at least one transmitting and receiving lens system, whereby these systems can be configured as a shared optical element or as separate optical elements. A transmitting lens system is arranged in an optical transmitting path having an optical axis in order to emit a measuring beam onto the target object. A receiving lens system is arranged in an optical receiving path having an optical axis in order to receive a measuring beam that has been reflected and/or scattered by the target object.

A method of the above-mentioned type used for contactless distance measurement or an optical measuring apparatus configured for this purpose can be further improved. For instance, German revised patent DE 100 51 302 C5 describes a laser distance-measuring device in which the transmitting and receiving paths are oriented in parallel, and the sensitivity of the measuring apparatus is increased. Other measuring apparatuses are disclosed, for example, in European patent specification EP 1 718 989 B1 or in European patent application EP 1 913 416 A1. European patent document EP 0 701 702 describes an optical measuring apparatus in which the image plane and the object plane can be moved with respect to each other. German patent document DE 196 43 287 discloses a calibration method for an optical measuring apparatus in a measuring device of the above-mentioned type. Another possibility for compensating for measuring uncertainties is described in German patent document DE 102 32 878, in which characteristics of predetermined measuring uncertainties are stored in a storage medium. Like in EP 0 701 702 and DE 100 51 302, the attempt is made in German patent document DE 101 57 378 to improve the measuring accuracy by manipulating the optical measuring apparatus, namely, by deflecting the optical axes.

SUMMARY OF THE INVENTION

It is desirable to put forward a distance-measuring device for a contactless distance measurement in which the measuring uncertainty is further improved, particularly with respect to the measuring uncertainties of a handheld device. When a distance measurement is carried out by hand, that is to say, especially without the use of a tripod, it is practically impossible to hold the measuring spot steady on the measured object during the measurement. As is described, for example, in German patent document DE 103 44 586 or in German patent DE 198 04 051 B4, the measurement is normally carried out in that the optical measuring beam of the measuring apparatus is directed at the target object and the optical measuring beam that is reflected by the target object is detected in the measuring apparatus using the transmitting and receiving lens system explained above.

Since every user has natural shaking movements to varying degrees—also referred to as tremors—especially the manual use of a measuring device has proven to be problematic when relatively narrow objects such as columns, street lamps or the like are to be surveyed. Other problematic areas can be edges of the object to be measured if, in case of a tremor, it is not ensured that the measuring point that reflects the measuring beam off the target object is either only to the right or only to the left of the edge. This problem is all the more serious as the distance between the measuring device and the target object increases.

It is an object of the present invention to provide a measuring device for the contactless measurement of the distance to a target object, whereby the measuring accuracy is improved and the dynamic range of the measuring apparatus is increased. In particular, the measuring uncertainty resulting from user-related handling should be reduced. Especially, a movement of the measuring device caused by the user, particularly a tremor-related movement of the measuring device, should have the smallest possible effect on the measuring accuracy of the device.

The invention is based on the consideration that, aside from the measuring uncertainty inherent to the measuring method, most of the measuring uncertainties in a distance-measuring device of the above-mentioned type result from a movement of the housing during the measurement; this is particularly true in the case of a handheld device. Moreover, the invention is based on the consideration that such movements take place within a certain dynamic range which, on the one hand, are perhaps not noticed by the user but, on the other hand, nevertheless have an influence on the measurement; in other words, these movements can be technically detected by means of a motion sensor. Before this backdrop, the concept of the invention proposes that at least one optical element that influences the optical transmitting path can be moved relative to an initial position, and a motion sensor is configured so as to detect a movement of the housing during the measurement. On the basis of this combination, the concept of the invention proposes that at least one movable optical element can be moved out of the initial position into a compensation position. This movement should be regulated in such a way that the transmitting path—outside of the housing—can be stabilized at a spatially fixed position within the scope of a compensation for the movement of the housing during the measurement. In an advantageous manner, the invention utilizes the advantages of a motion sensor in order to detect a movement of the housing. The signals of the motion sensor can be used to cause a movable optical element to execute a suitable counter-movement, that is to say, in such a way that the transmitting path can be stabilized at a spatially fixed position within the scope of a compensation for the movement of the housing during the measurement.

In an especially preferred refinement, it is provided that, by means of a control unit that is connected to the motion sensor on the input side and to an opticator on the output side, a motion signal provided by the motion sensor can be converted into an actuator signal for the opticator. In particular, the movable optical element can be moved by means of the opticator in response to the actuator signal. In other words, the refinement comprises a control unit having a control circuit that uses a motion signal of the motion sensor in order to regulate the opticator in such a manner that the movable optical element is made to execute a suitable counter-movement. In other words, it is not so much a spatially fixed position but rather, the movement of the housing that is employed as the control variable.

Advantageously, according to the concept of the invention or of the refinement, the measured results need not be influenced by measuring uncertainties resulting from a movement of the measuring point on the target object. In particular, due to the spatially fixed stabilization of the transmitting path during the measurement, it is achieved that the measuring point remains stationary on the target object. This is especially applicable to movement dynamics and to a movement amplitude in the range of a natural shaking movement (tremor) of a user of the measuring device. This advantage especially comes to the fore in the case of a measuring device in the form of a handheld device. As a result, the measuring device can easily be handled more precisely and conveniently since a user can then aim at the target object more precisely and, in any case, more conveniently. In particular, a user is capable of detecting even narrow irregularities on the target object during the measurement, and also capable of accurately aiming at narrow target objects for a prolonged period of time. At the very least, however, the concept of the invention considerably reduces the fluctuation range of a measuring signal. This also makes it easier to read the distance value off of the measuring device.

Advantageous refinements of the invention can be gleaned from the subordinate claims and they provide an in-depth presentation of advantageous possibilities for realizing the concept explained above within the scope of the envisaged objective as well as in terms of additional advantages.

In an especially preferred embodiment, the movable optical element is realized in the form of an optical unit that can be moved in its entirety, especially with all of the optical elements. In other words, the entire optical unit can be moved out of an initial position into a compensation position in such a way that the transmitting path can be stabilized at a spatially fixed position within the scope of a compensation of the position during the measurement. For this purpose, it can especially be provided that all of the optical elements can be moved together and to the same extent by means of an opticator in response to an actuator signal; for instance, a platform of the optical unit or of similar connecting means of all the optical elements can be made to execute a suitable counter-movement. By the same token, additionally or alternatively, especially preferably and also equally applicably for the variants elaborated upon below, the movable optical element can be configured so as to be separate from the transmitting and receiving lens systems, particularly completely separate from the optical unit as such. For instance, a mirror or another similar movable and deflecting optical element is suitable as the movable optical element in the transmitting and/or receiving path. For purposes of stabilizing the transmitting path at a spatially fixed position within the scope of a compensation of the position during the measurement, an optical unit can advantageously be produced in the proven manner and the movable optical element can additionally be made available.

The measuring apparatus that makes use of an optical measuring beam by means of which the distance to the target object can be measured contactlessly can advantageously be realized in the form of a so-called biaxial variant or advantageously in the form of a so-called coaxial variant. The above-mentioned nomenclature refers to the relative arrangement of the transmitting path and the receiving path with respect to each other. In the case of the biaxial variant, it is advantageously provided that the transmitting path runs biaxially to the receiving path via an output element of the transmitting lens system. The output element of the transmitting lens system can advantageously be an out-coupling lens or the like. In the case of the biaxial variant, it has proven to be especially advantageous for the moveable optical element to be configured in the form of the output element. In other words, the output element of the transmitting lens system can be moved relatively easily and advantageously in response to the actuator signal. This entails the advantage that the transmitting path can be stabilized so as to be spatially fixed within the scope of a compensation for the movement of the housing during the measurement, without affecting other areas of the measuring apparatus.

Advantageously, an input element of the receiving lens system such as, for example, an in-coupling lens or the like, can be moved as needed. In particular, the input element can be moved in response to the actuator signal by means of an opticator connected to the control unit. Such a measure has the advantage that even transmitting path stabilizations of a large amplitude are possible without this detrimentally affecting the received signal amplitude. Furthermore, a sensor surface of the receiving path can also be dimensioned sufficiently large so that a reflected and/or scattered measuring beam can be detected, even in the case of a stabilized transmitting path with a relatively high stabilization amplitude. As the size of the sensor surface increases, more noise is generated by ambient light, as a result of which the sensitivity decreases.

In an especially preferred second variant, it is provided that, in the measuring apparatus, the transmitting path runs coaxially to the receiving path via a shared output element of the transmitting and receiving lens system. For instance, the shared output element can be configured as a collimator lens or the like. In this refinement, it has proven to be particularly advantageous for the movable optical element to be configured in the form of the shared output element. In this manner, it is relatively easy to stabilize the transmitting path of the measuring apparatus so as to be spatially fixed within the scope of a compensation for the movement of the housing during the measurement. At the same time, the receiving path is also adapted accordingly, since the movable optical element is configured in the form of the shared output element. A stabilization of the transmitting path has practically no detrimental effect on the signal level in the receiving path.

Advantageously, within the scope of this refinement, the optical unit has a movable beam splitter in the transmission and receiving path, and this beam splitter constitutes the movable optical element. A beam splitter of the above-mentioned type combines transmitting and receiving paths—which at first run separately—so as to form a shared transmitting and receiving path, and it conducts them to a shared output element of the transmitting and receiving lens system. According to this refinement, the movable beam splitter can be moved from an initial position into a compensation position in such a way that the transmitting path—especially a transmitting path that has been conducted so as to be deflected at the beam splitter—is stabilized so as to be spatially fixed within the scope of a compensation of the movement of the housing during the measurement.

Advantageously, the transmitting path is rotated, that is to say, it undergoes an angular movement, within the scope of a compensation of a housing movement. Within the scope of an especially preferred refinement—particularly for all of the above-mentioned variants—the movable optical element can be rotated around at least one axis, preferably two axes. Within the scope of a refinement, the movable optical element can be configured in such a way that it can be rotated around three axes. Within the scope of this refinement, the opticator can be advantageously configured as a rotary motor or the like. It has been recognized in this refinement that a rotation of a measuring beam is fundamentally relatively sensitive with respect to the signal quality in the receiving path. Thus, it was recognized that a rotation of the measuring beam in the transmitting path, for example, by 0.1° within a distance of 20 meters, already causes the target point of the measuring beam on a target object to shift by 3.5 cm. The amplitude of 0.1°, however, still falls well within the range of a tremor movement of a user. A user regularly influences a measurement without being aware of this by rotating the measuring beam. In particular, this holds true under poor measuring conditions such as when the ambient light is bright and the target object has a dark surface. When it comes to target objects that are narrower than 3.5 cm, it can normally take a few seconds until a stable measuring signal is obtained. The above-mentioned refinement, utilizing a transmitting path that has been rotated for compensation purposes, ensures that a target point on the target object remains in place with a relatively small fluctuation amplitude, that is to say, the transmitting path is stabilized at a spatially fixed position.

Within the scope of this refinement, the motion sensor is preferably configured as an angular-acceleration sensor or as an angular-rate sensor or the like. In particular, the angular-acceleration sensor should be able to measure an angular acceleration around at least one, preferably two, and if applicable three, axes. A MEMS (micro-electro-mechanical system) angular-rate sensor or a gyroscope or a similar miniaturized angular sensor has proven to be especially well-suited for this purpose.

Furthermore, it has proven advantageous, particularly as an additional measure, that the movable optical element can be moved along at least one, two or three axes. In particular, an opticator can be configured as a position motor or the like. In this embodiment, the motion sensor is preferably configured as a linear acceleration sensor or as a position sensor or the like. Even if the shift of the transmitting path as such only has a small effect on the receiving signal, this quantity is not always negligible. The stabilization of the transmitting path that, by means of a shifting movement—in addition to or as an alternative to a rotational movement—reacts to and compensates for a shift of the housing of the measuring device, constitutes another advantageous contribution to the reliability of the measuring accuracy.

In concrete terms, an opticator can be configured particularly advantageously in the form of a miniature motor, a piezo actuator or a magnetic and/or electric actuator or the like. Such an opticator can be accommodated in a measuring apparatus that utilizes an optical measuring beam in such a way that it is easy to actuate and it is relatively compact as well as lightweight.

BRIEF DESCRIPTION OF THE DRAWINGS

Embodiments of the invention will be described below on the basis of the drawing. The drawing does not necessarily depict the embodiments true-to-scale, but rather, the drawing is presented in schematic and/or slightly distorted form whenever necessary for the sake of clarity. Regarding additions to the teaching that can be gleaned directly from the drawing, reference is hereby made to the pertinent state of the art. In this context, it should be taken into account that a wide array of modifications and changes pertaining to the shape and the detail of an embodiment can be made, without deviating from the general idea of the invention. The features of the invention disclosed in the description, in the drawing as well as in the claims, either on their own or in any desired combination, can be essential for the refinement of the invention. Moreover, all combinations of at least two of the features disclosed in the description, in the drawing and/or in the claims fall within the scope of the invention. The general idea of the invention is not limited to the exact shape or details of the preferred embodiment shown and described below, nor is it limited to an object that would be restricted in comparison to the subject matter claimed in the claims. Regarding the dimensional ranges given, values that fall within the cited limits can also be disclosed as limit values and can be employed and claimed as desired. For the sake of simplicity, the same reference numerals will be used below for identical or similar parts or for parts having an identical or similar function.

Additional advantages, features and details of the invention ensue from the description below of preferred embodiments as well as from the drawing; this shows the following.

DETAILED DESCRIPTION

Figure 1A:
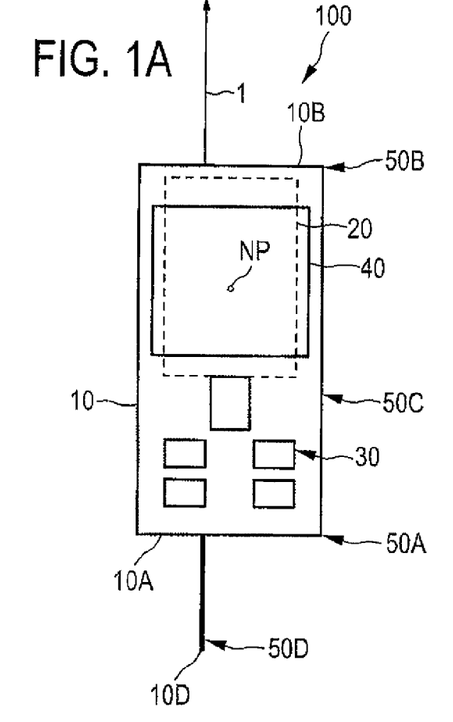
FIG. 1A, 1B: a schematic view of a distance-measuring device in the form of a handheld device for contactless distance measurement, in a front view (FIG. 1A) and in a side view (FIG. 1B)
Figure 1B:
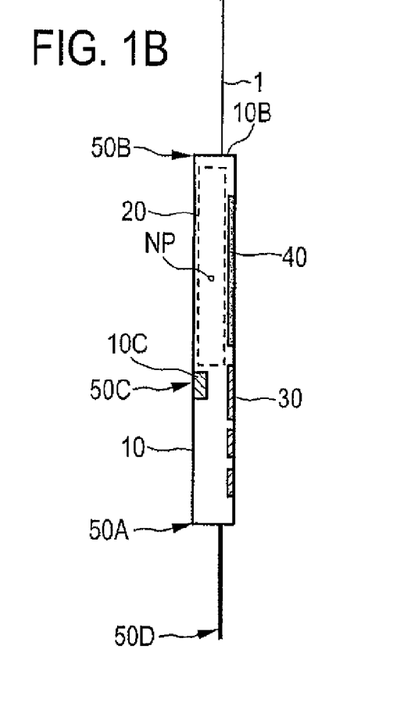

FIGS. 1A, 1B show a distance-measuring device 100 in the form of a handheld device for the contactless measurement of the distance to a target object, whereby the distance-measuring device 100 in FIG. 1A is shown in a front view on the operating side of the housing 10 while in FIG. 1B, a side view of the housing 10 is shown—the components of the distance-measuring device 100 are depicted schematically.

Figure 2A:
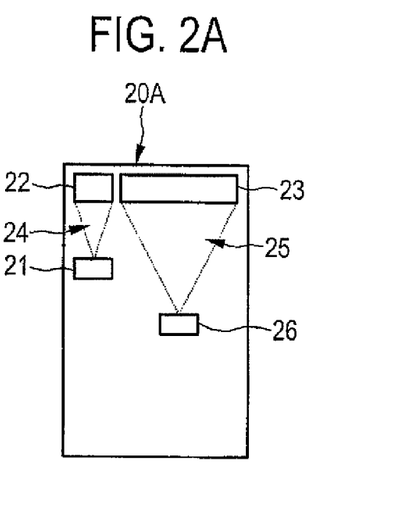
FIG. 2A, 2B: two especially preferred variants of the distance-measuring device of FIG. 1, with a varied measuring apparatus—in FIG. 2A with a biaxial beam arrangement and in FIG. 2B with a coaxial beam arrangement.
Figure 2B:
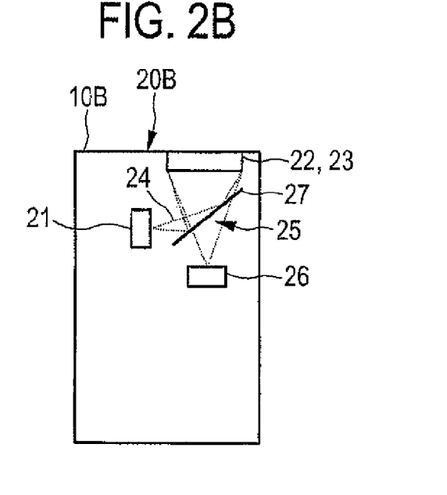

The distance-measuring device 100, which can also be referred to as a handheld laser distance-measuring device, has a housing 10 that is configured to allow handheld use; here, it is only slightly larger than the surface of a hand and it has good handling characteristics and ergonomics; however, for the sake of simplicity, the housing 10 is shown here with a rectangular shape. A measuring apparatus 20 that uses an optical measuring beam 1 and that can also be referred to as a laser distance-measuring device is accommodated in the housing 10. Conceivable variants of the measuring apparatus 20 are shown in FIGS. 2A, 2B. Different handling scenarios for the contactless measurement of the distance to a target object are shown in greater detail in FIGS. 3A and 3B.

The distance-measuring device 100 has an operating and input array 30 arranged on the housing 10 that is configured here as a keyboard embedded in operating side of the housing 10. A visual display 40 is embedded in the operating side of the housing 10 and this is where the measured distance from a target object as well as the operating status of the distance-measuring device 100 can be displayed. The operating and input array 30 can be used to operate the measuring apparatus 20, and also to select one of the reference stops of the housing 10—which will be explained below. Whereas the measurement employing an optical measuring beam 1—here a laser beam, for example—relates to a housing-internal reference zero point NP, a user will often want to measure the distance to the target object relative to one of the reference stops 50A, 50B, 50C or 50D. Once the user selects a reference stop, for instance, by means of the operating and input array 30, the distance to the target object can be related to various reference stops employing fixed addition constants. The most important reference stop 50A is installed on the rear 10A of the device. Moreover, there are still other reference stops 50B, 50C, 50D, for instance, on the front 10B of the device or at the tip 10D of a measuring extension or on a fastener 10C for a tripod, whose mid-point can likewise serve as the reference stop 50C.

Figure 3A:
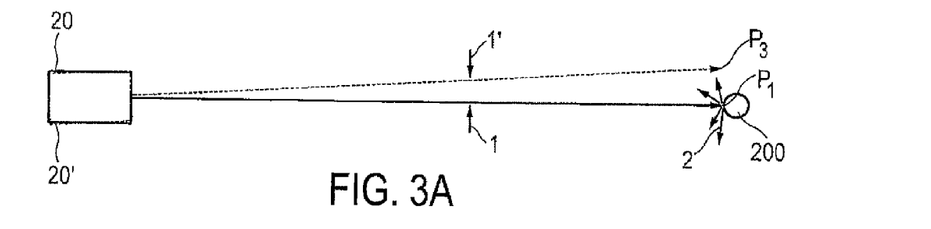
FIG. 3A, 3B: an illustrative depiction of the influences that a rotation of the device (FIG. 3A) or a shift of the device (FIG. 3B) have on a distance measurement.
Figure 3B:
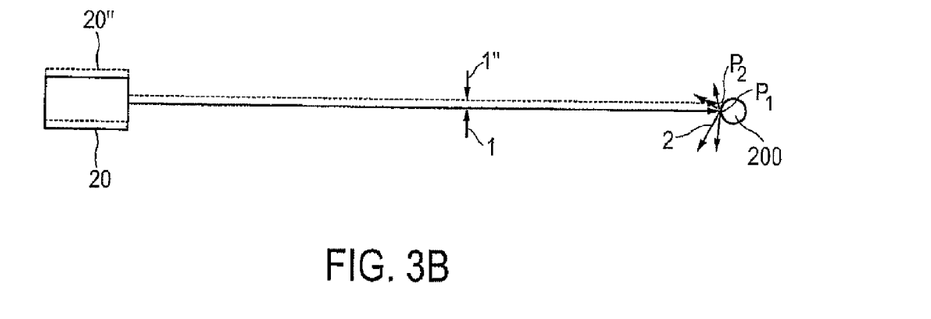

Regarding FIGS. 3A and 3B, the methods elaborated upon above can be employed in order to determine the distance between a target object 200 and the reference zero point NP of the measuring device 100. Here, the distance-measuring device 100 has a measuring apparatus 20 that utilizes an optical measuring beam 1 and that is based on a runtime measurement. Two variants of the measuring apparatus 20A, 20B, of the type that can be employed for a measuring apparatus 20 are shown by way of an example in FIGS. 2A, 2B. Both measuring apparatuses 20A, 20B have a radiation unit 21, for instance, a laser unit, as well as a transmitting lens system 22 and a receiving lens system 23. The measuring apparatus 20A, 20B also has an optical transmitting path 24 with an optical axis for purposes of emitting a measuring beam 1, here a laser beam, onto the target object 200. Moreover, the measuring apparatus 20A, 20B has an optical receiving path 25 that has an optical axis for purposes of receiving a measuring beam 2 that reflects off a target object 200. A detector 26, for example, a photodiode that serves to detect a reflecting and/or scattered measuring beam 2, is arranged in the receiving path 25. In both types of measuring apparatuses 20A, 20B, the receiving lens system 23 serves to focus the reflecting and/or scattered measuring beam 2 onto the detector 26. The measuring apparatus 20A is configured with a separate transmitting lens system 22 and receiving lens system 23, so that the transmitting path 24 and the receiving path 25 do not overlap. This arrangement of the paths 24, 25 in the measuring apparatus 20A is also referred to as a biaxial arrangement. In contrast to this, the measuring apparatus 20B is configured with a coaxial arrangement of the paths 24, 25, whereby the transmitting path 24 and the receiving path 25 are combined by means of a beam splitter 27, and they overlap in the two shared transmitting and receiving lens systems 22, 23. The transmitting path 24 and the receiving path 25 run separately in the area between the laser unit 21 and the beam splitter 27 or between the detector 26 and the beam splitter 27.

Concretely speaking, as can also be seen in FIGS. 3A and 3B, with the measuring apparatus 20 that is configured as a laser distance-measuring unit, the measuring beam 1 from a laser unit 21 in the form of a laser diode is bundled by means of an optical lens of the transmitting lens system 22. The bundled measuring beam 1 comes from the front 10B of the housing and is aimed at the target object 200—for instance, a measuring point $P_1$, $P_2$, $P_3$ there—and it forms a light spot at the measuring point $P_1$, $P_2$, $P_3$. The reflected and/or scattered measuring beam 2 is imaged onto the active surface of a photodiode of the detector 26 by means of an optical lens of the receiving lens system 23 in the manner explained. The measuring apparatus 20 here can be configured biaxially or coaxially. For purposes of determining the distance from the target object 200 to the reference zero point NP of the measuring device 100—along the back and forth paths—the measuring beam 1, here the laser light of a laser beam, is modulated. The modulation can be carried out in the form of a pulse or in sinusoidal form. The modulation is carried out in such a manner that the time differential between a transmitted and a received measuring-beam modulation can be measured. Consequently, the light speed factor can provide information about the simple distance between the reference zero point NP of the measuring device 100 and the target object 200. This can be calculated, for example, in a control unit.

Figures 4A, 4B:
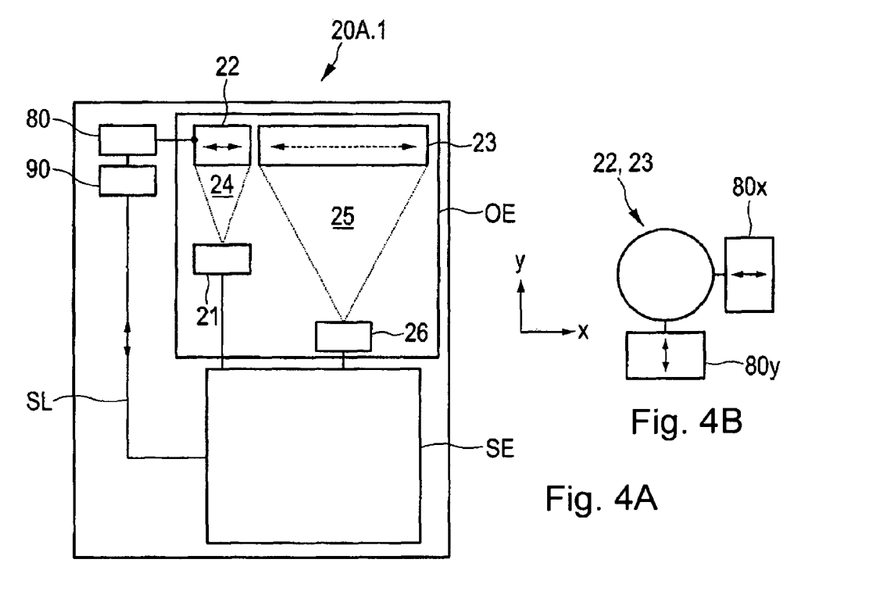
FIG. 4A: a measuring apparatus with a stabilization of the transmitting path that increases the measuring accuracy, for a measuring device having a biaxial beam arrangement, whereby a separate output element of the transmitting lens system can be moved into a suitable variable compensation position.
FIG. 4B: the opticator of FIG. 4A in more detail.
Figure 5:
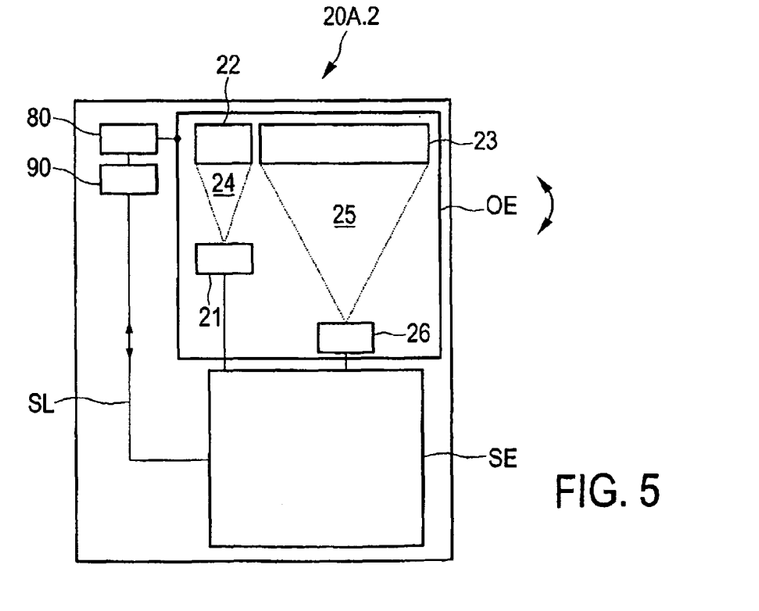
FIG. 5: an embodiment that is a modification of that of FIG. 4A, in which the entire optical unit can be rotated by means of an opticator into a suitable variable compensation position in response to an actuator signal.

In an illustrative manner, FIG. 3A also shows the problems associated with a distance measurement by hand without the use of a tripod. Since, to varying degrees, every person makes natural shaking movements (tremor)—mainly in the case of narrow target objects such as the target object 200 in FIG. 3A—there is a great risk that, for instance, if the measuring beam is rotated by a mere 0.1° C., causing it to become a rotated measuring beam 1' during the measurement, the measuring point $P_3$ no longer strikes the target object 200. This condition is encountered with the conventional housing-fixed transmitting paths due to tremor-related movement of the housing 10. In any case, however, a measuring point $P_1$ can have a different reflected and/or scattered measuring beam 2 than a measuring point $P_3$, so that the change in the reflected and/or scattered measuring beam 2 leads to a different measuring result due to a rotation of the conventional housing-fixed transmitting path 24. This situation can be expected in practically every measurement in which a rotated measuring beam 1' comes from a measuring apparatus 20' that has been rotated with the housing 10. It has been recognized that a rotation of the measuring apparatus 20, causing it to become a rotated measuring apparatus 20', is relatively critical. The shift of the measuring apparatus 20 shown in FIG. 3B, causing it to become a rotated measuring apparatus 20", is relatively uncritical here but, at the same time, it still has an influence. Even though the shifted measuring apparatus 20" also causes a measuring beam 1 to become a shifted measuring beam 1", at the same movement amplitude, the beam still has a measuring point $P_2$ on the target object 200 that, like the measuring point $P_1$, generates a reflected and/or scattered measuring beam 2. Nevertheless, one naturally has to expect a change in the reflected and/or scattered measuring beam 2, so that a shifted measuring apparatus 20" can also give rise to measurement inaccuracies due to a tremor movement on the part of the user, Below, for the sake of simplicity, the same reference numerals are used for identical or similar parts or for parts having an identical or similar function. FIGS. 4 and 5 show slightly modified embodiments according to a first variant of a measuring apparatus 20A.1 and 20A.2 that can be employed according to the concept of the invention in a measuring device 100 as the measuring apparatus 20 or as a refinement of the measuring apparatus 20A of FIG. 2A.

Figures 6A, 6B:
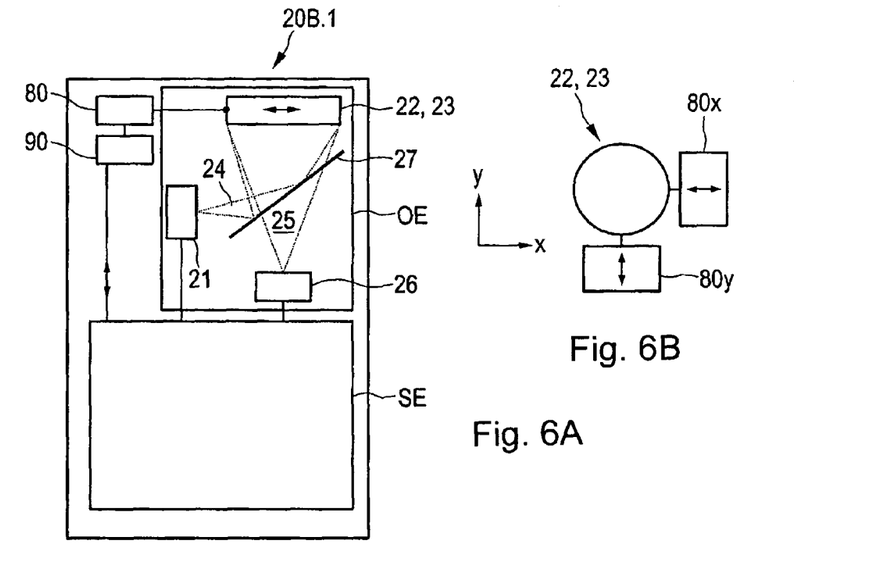
FIG. 6A: a measuring apparatus with a transmitting-path stabilization that increases the measuring accuracy, for a measuring device having a coaxial beam arrangement, in which a shared output element of the transmitting and receiving lens system can be moved into a variable compensation position in such a way that the transmitting path can be stabilized at a spatially fixed position within the scope of a compensation of a movement of housing during the measurement.
FIG. 6B: the opticator of FIG. 6A in more detail.
Figure 7:
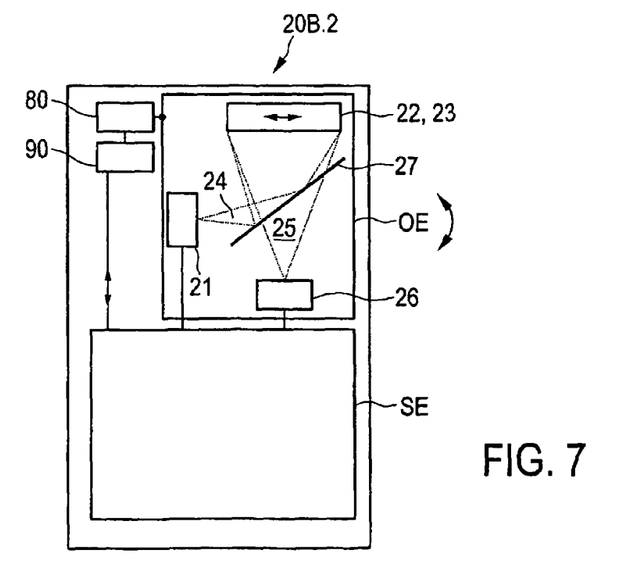
FIG. 7: an embodiment that is a modification of that of FIG. 6A, in which the entire optical unit can be rotated by means of an opticator in response to an actuator signal.

FIGS. 6a and 7 show modified embodiments of a measuring apparatus 20B.1, 20B.2 that can be employed instead of the measuring apparatus 20 or as a modification of the measuring apparatus 20B shown as a variant in FIG. 2B.

Figure 8:
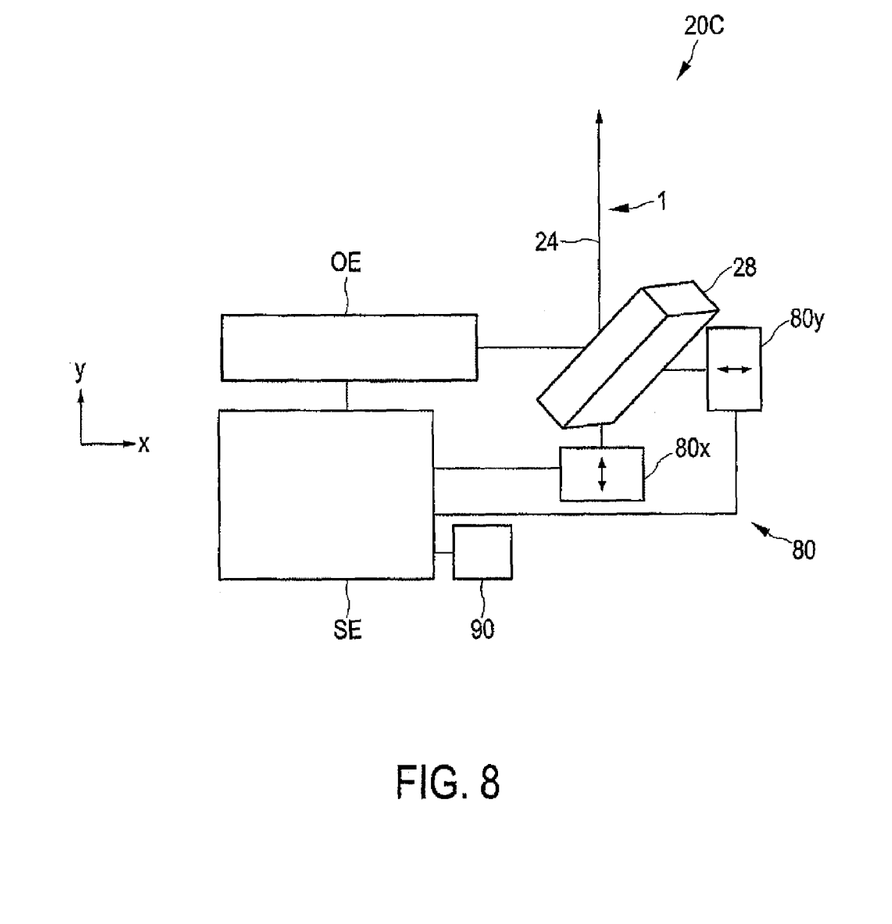
FIG. 8: an especially preferred embodiment in which a movable tilting mirror in the transmitting and receiving path of a biaxial or coaxial measuring apparatus can be rotated into a variable compensation position in such a way that the transmitting path is stabilized so as to be spatially fixed within the scope of a compensation of the movement of the housing during the measurement.

FIG. 8 shows an especially preferred embodiment of a measuring apparatus 20C.

FIG. 4A illustrates a first preferred embodiment of a measuring apparatus 20A.1 that is based on the measuring apparatus 20A of FIG. 2A. The measuring apparatus 20A.1 has an optical unit OE that comprises the transmitting lens system 22, the receiving lens system 23 as well as the radiation unit 21 and the detector 26. The optical unit OE having a biaxial arrangement is connected to a control unit SE that regulates the radiation unit 21 and the detector 26. The transmitting lens system 22, here an out-coupling lens, is configured so that it can be moved relative to an initial position, which is indicated by the double-pointed arrow in the transmitting lens system 22. An opticator 80 of the measuring apparatus 20A.1 is connected to the transmitting lens system 22 and can shift it laterally in two directions x, y, as a result of which the measuring beam 1 that is coupled out by the transmitting lens system 22 can be influenced. In addition, the measuring apparatus 20A.1 has a motion sensor 90 that is configured to detect a movement of the housing 10 and/or of the measuring apparatus 20A.1 during the measurement. The motion sensor 90 here is implemented in the form of an angular-rate sensor. Moreover, the rotation of the housing 10 and/or of the measuring apparatus 20A.1 and thus also of the measuring beam 1 around the x-axis as well as around the y-axis can be detected during the measurement. For instance, MEMS angular-rate sensors or gyroscopes are suitable as sensors. These can be employed in uniaxial, biaxial or triaxial configurations. A motion signal can be fed to the control unit SE via a control line SL and it can then be converted by the control unit SE into an actuator signal for the opticator 80, which is configured as a position motor. Here, this entails the advantage that the control unit SE can actuate the opticator 80 digitally by means of a processor. In a modification, the motion signal of the motion sensor 90 can also be used directly for the opticator 80, for example, by means of an amplifier, and in analog form, in order to actuate it. As a result, the moveable optical element in the form of a transmitting lens system 22 can be moved in response to the actuator signal—here shifted laterally in the x-direction and/or in the y-direction. In this context, the fact is utilized that the lateral shift of the transmitting lens system 22 relative to the optical axis is associated with an angular change of the measuring beam 1 in the transmitting path 24. In concrete terms, when the opticator 80 is used, the transmitting lens system 22 can be shifted in the x-direction and/or y-direction on the basis of the motion signals of the motion sensor 90 as the regulating variable in such a way that the transmitting path 24 outside of the measuring apparatus 20A.1 is stabilized at a spatially fixed position within the scope of a compensation of the movement of the housing 10 during the measurement.

In the embodiment shown in FIG. 4A, the motion sensor 90 is an angular-rate sensor. Additionally, the shifting of the housing 10 in the x- and y-directions can also be detected using an MEMS acceleration sensor. Here, too, the opticator 80, which is actuated by the control unit SE via the control line SL, can be actuated by means of the motion signals in response to an actuator signal.

Here, in order to convert the motion signals resulting from the rotation and shifting of the housing 10 into an actuator signal, to start with, a rough intermediate result of a measured distance to the target object 200 can be used. This allows a more effective configuration of a control loop. Miniature motors, piezo actuators or actuators on the basis of magnetic and/or electric forces are suitable as the opticator 80. Likewise conceivable are other operating principles for actuators, which are not listed here.

The embodiment shown in FIG. 4A functions particularly well in the case of a likewise variable movement of the transmitting lens system 23 indicated by the double-headed arrow. Said transmitting lens system 23 can be moved by an additional actuator (not shown here) or by the opticator 80. Since the reflected and/or scattered measuring beam 2 is kept on the detector in the receiving path 25, even when the compensation position of the transmitting path 24 has been changed, even large movement amplitudes can be implemented. If applicable, the surface of the detector 26 can be dimensioned correspondingly large. In this manner, a high level of sensitivity of the detector 26 vis-à-vis the reflected and/or scattered measuring beam 2 is ensured in any case, even though the transmitting path has been stabilized so as to be spatially fixed and assumes a continuously variable compensation position.

FIG. 5 shows a slightly modified measuring apparatus 20A.2 in which the optical unit OE is implemented, one again, in a biaxial configuration. Here, too, a motion sensor 90 in the form of an angular-rate sensor serves to rotate the housing 10 as well the measuring apparatus 20A.2 around the x-axis as well as around the y-axis during a measurement. The control unit SE converts the appertaining motion signal into an actuator signal for the opticator 80 and transmits this via the control line SL. In order to avoid an individual movement of the transmitting lens system 22 as well as of the receiving lens system 23—as is necessary, for example, in FIG. 4A—an opticator 80 is provided here as a rotary motor for purposes of rotating the entire optical unit OE around the x- and/or y-axis on the basis of the actuator signals in such a way that the angle of the measuring beam 1 in the transmitting path 24 is stabilized so as to be spatially fixed, and thus a measuring point $P_1$ is arranged so as to be spatially fixed on the target object 200. Once again, the opticator 80 can be actuated by means of the control unit SE or by means of an amplifier—i.e. by digital or analog means. Here, too, in addition to the rotation of the housing 10, a shift of the housing 10 can also be detected. In this case as well an intermediate result of the measured distance to a target object 200 can be utilized to stabilize the transmitting path 24 and thus the measuring point $P_1$ on the target object 200.

FIG. 6A shows a second preferred embodiment of a measuring apparatus 20B.1 based on a coaxial structure of an optical unit OE, as has already been shown in FIG. 2B. In addition, a control unit SE and an opticator 80 as the position motor, in turn, are connected to the optical unit OE. The control unit SE, once again, serves to control the laser unit 21 and to record detector data gathered from the detector 26. By means of a control unit SE that is connected on the input side to the motion sensor 90—here, once again in the form of an angular-rate sensor of the above-mentioned type—and on the output side to an opticator 80—as a position motor—a motion signal provided by the motion sensor 90 can be converted here into an actuator signal for the opticator 80. The opticator 80 again acts upon a movable optical element in response to the actuator signal, whereby the optical element is configured here as a transmitting and receiving lens system 22, 23 in the form of a collimator lens. The collimator lens 22, 23 is shared by the overlapping transmitting and receiving paths 24, 25, whereby the measuring beam 1 is coupled out by the collimator lens 22, 23, while the measuring beam 2 that is reflected and/or scattered by the target object 200 is coupled in by the collimator lens 22, 23. On the right-hand side, as can be clearly seen in FIG. 4A as well as FIG. 6B, the drawing shows that the opticator 80 basically encompasses two functions; an actuator unit 80x and an actuator unit 80y are formed for a lateral shift in the x-direction and in the y-direction, respectively. Here, too, the fact is utilized that a shift of the collimator lens of the transmitting and receiving lens system 22, 23 is associated with an angular change in the collimated laser beam.

FIG. 7 shows a measuring apparatus 20B.2, which is slightly modified with respect to 20B.1, and in which, similarly to FIG. 5, the entire optical unit OE is rotated in response to an actuator signal by the opticator 80 in the form of a rotary motor. As a result, the optical unit OE is rotated out of the initial position into a variable compensation position in such a way that the transmitting path 24 is stabilized so as to be spatially fixed in the out-coupled area outside of the measuring apparatus 20B.1 within the scope of a compensation of the movement of the housing 10 during the measurement.

FIG. 8 shows a third embodiment of a measuring apparatus 20C that has an optical unit OE, a control unit SE, an opticator 80 and a motion sensor 90 comprising an angular-acceleration sensor and a linear-acceleration sensor. The motion sensor 90 is connected on the input side to the control unit SE and it provides a motion signal—here in the form of an angular-acceleration signal and a linear-acceleration signal—to the control unit SE. The control unit SE converts the motion signal into an actuator signal for the opticator 80, the latter, once again, consisting of an actuator unit 80x and an actuator unit 80y for a movement in the x- and y-directions, respectively. Owing to the actuator signal and in response thereto, once again, a movable optical element, namely, a tilting mirror 28 in the embodiment shown in FIG. 8, is moved out of an initial position into a variable compensation position. Here, the tilting movement takes place in the x- or y-direction in such a way that the transmitting path 24 for the measuring beam 1 is stabilized so as to be spatially fixed within the scope of a compensation of the movement of the housing 10 during the measurement. In contrast to the embodiments elaborated upon above, the tilting mirror 28 is configured as a movable optical element separately from the optical unit OE explained above and separately from a transmitting and receiving lens system 22, 23. Therefore, the optical unit OE can be structured here biaxially in accordance with the measuring apparatus 20A shown in FIG. 2A, or coaxially in accordance with the measuring apparatus 20B shown in FIG. 2B. The measuring beam 1 in the transmitting path 24 is emitted by the optical unit OE and reaches the measuring point $P_1$ of the target object 200 via the tilting mirror 28. By means of a motion sensor 90—here a combination of an angular-rate sensor and a position sensor—the control unit SE digitally converts the rotation of the housing 10 into a compensating, variable compensation position of the tilting mirror 28. Here, too, instead of the digital configuration with a control unit SE, the tilting mirror 28 can be actuated through an amplifier directly by the opticator 80. For this purpose, as in the embodiments explained above, the amplifier is suitably configured to generate an analog opticator signal from the motion signal.

What is claimed is:

1. A distance-measuring device for contactless measurement of a distance to an object, the device comprising:
   a housing;
   a measurer utilizing an optical measuring beam and arranged in the housing, the measurer capable of measuring the distance to the target object contactlessly, the measurer including:
   a radiation unit,
   an optical unit with optical elements including:
      a transmitting and receiving lens system,
      an optical transmitting path with an optical axis for emitting the measuring beam onto the target object, and
      an optical receiving path with a further optical axis for receiving the measuring beam reflected and/or scattered by the target object,
      at least one of the optical elements being movable and influencing the optical transmitting path and movable relative to an initial position; and
   a motion sensor configured to detect a movement of the housing during the measurement,
   the at least one movable optical element movable out of an initial position into a variable compensation position to stabilize the transmitting path at a spatially fixed position within a range of a compensation of the movement of the housing during the measurement,
   wherein the transmitting path runs biaxially to the receiving path via an output element of the transmitting lens system, and the movable optical element is configured in the form of the output element.

2. The distance-measuring device as recited in claim 1 further comprising a controller connected to the motion sensor on an input side of the controller and to an actuator on an output side, a motion signal provided by the motion sensor convertable into an actuator signal for the actuator, the movable optical element movable by the actuator in response to the actuator signal.

3. The distance-measuring device as recited in claim 1 wherein the optical unit in its entirety defines the at least one movable optical element.

4. The distance-measuring device as recited in claim 1 wherein the optical unit movable by an actuator in response to an actuator signal.

5. The distance-measuring device as recited in claim 1 wherein the movable optical element is an out-coupling lens.

6. The distance-measuring device as recited in claim 1 wherein an input element of the receiving lens system is movable.

7. The distance-measuring device as recited in claim 6 wherein the input element is movable by an actuator connected to a controller in response to an actuator signal.

8. The distance-measuring device as recited in claim 6 wherein the input element is an in-coupling lens.

9. The distance-measuring device as recited in claim 1 wherein the transmitting path runs coaxially to the receiving path via a shared output element of the transmitting and receiving lens system, and the movable optical element is configured in the form of the shared output element.

10. The distance-measuring device as recited in claim 9 wherein the shared output element is a collimator lens.

11. The distance-measuring device as recited in claim 9 wherein the movable optical element of the optical unit is a movable beam splitter in the transmission and receiving path.

12. The distance-measuring device as recited in claim 11 wherein the movable beam splitter is tiltable.

13. The distance-measuring device as recited in claim 1 wherein the movable optical element is configured to be separate from the transmitting and receiving lens systems in the transmitting path and/or in the receiving path.

14. The distance-measuring device as recited in claim 13 wherein the movable optical element is a mirror.

15. The distance-measuring device as recited in claim 1 wherein the movable optical element is rotatble about at least one axis.

16. The distance-measuring device as recited in claim 15 wherein the movable optical element is movable by an actuator configured as a rotary motor.

17. The distance-measuring device as recited in claim 1 wherein the motion sensor is configured as an angular-acceleration sensor or as an angular-rate sensor.

18. The distance-measuring device as recited in claim 1 wherein the movable optical element is movable along at least one axis.

19. The distance-measuring device as recited in claim 18 wherein the movable optical element is movable by an actuator configured as a position motor.

20. The distance-measuring device as recited in claim 1 wherein the motion sensor is configured as a linear-acceleration sensor or as a position sensor.

21. The distance-measuring device as recited in claim 1 wherein the movable optical element is movable by an actuator configured in the form of a miniature motor, a piezo actuator or a magneto-electric actuator.

22. The distance-measuring device as recited in claim 1 wherein the device is a handheld device, the housing being configured for handheld use.

23. The distance-measuring device as recited in claim 1 wherein the measuring apparatus measures the distance using a runtime measurement.

24. The distanc-mearuing device as recited in claim 1 wherein the radiation unit includes a laser.

* * * * *